United States Patent
Mehta et al.

(10) Patent No.: US 9,641,899 B2
(45) Date of Patent: May 2, 2017

(54) SOCIAL NETWORK CREATION AND INTERACTION

(75) Inventors: Japan A. Mehta, Coppell, TX (US); Shafiq Kassam, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 478 days.

(21) Appl. No.: 13/412,693

(22) Filed: Mar. 6, 2012

(65) Prior Publication Data
US 2013/0238697 A1 Sep. 12, 2013

(51) Int. Cl.
| H04N 21/478 | (2011.01) |
|---|---|
| H04L 12/58 | (2006.01) |
| H04N 21/4788 | (2011.01) |
| H04N 21/41 | (2011.01) |
| G06Q 50/00 | (2012.01) |
| G06Q 10/10 | (2012.01) |

(52) U.S. Cl.
CPC ........... *H04N 21/478* (2013.01); *G06Q 10/10* (2013.01); *G06Q 50/01* (2013.01); *H04L 51/046* (2013.01); *H04L 51/32* (2013.01); *H04N 21/4126* (2013.01); *H04N 21/4788* (2013.01)

(58) Field of Classification Search
CPC .............. G06Q 50/01; G06F 17/30864; G06F 17/30867; H04L 67/306; H04L 51/04; H04L 51/046; H04L 65/1083; H04L 65/4007; H04N 21/478; H04N 21/4782; H04N 21/4788; H04N 21/4627; H04N 21/4126; H04N 21/632

See application file for complete search history.

(56) References Cited

U.S. PATENT DOCUMENTS

| 8,505,054 B1* | 8/2013 | Kirley | H04N 21/4307 725/74 |
|---|---|---|---|
| 8,560,370 B2* | 10/2013 | Siegel | G01C 21/32 455/456.1 |
| 2003/0226143 A1* | 12/2003 | Michael | H04N 21/478 725/32 |
| 2004/0163130 A1* | 8/2004 | Gray | H04N 21/4782 725/132 |
| 2005/0197922 A1* | 9/2005 | Pezaris et al. | 705/27 |
| 2008/0040437 A1* | 2/2008 | Agarwal | H04L 51/36 709/206 |
| 2008/0243933 A1* | 10/2008 | Holtzman | G06Q 10/06 |
| 2008/0281926 A1* | 11/2008 | Walter | H04N 21/4882 709/206 |
| 2009/0143052 A1* | 6/2009 | Bates et al. | 455/414.2 |

(Continued)

OTHER PUBLICATIONS

Kramer, Staci, "Comcast and Plaxo Invite You to the Marriage of Set-top Box and Social Software", May 15, 2008, washingtonpost.com.*

*Primary Examiner* — Ramy M Osman

(57) ABSTRACT

A computing device may establish a connection with a user device and retrieve address book information corresponding to the user device. The address book information may include contact information corresponding to one or more individuals. The computing device may identify social network users corresponding to the address book information. Each social network user may include a subscriber to a particular network service. The computing device may create a social network based on the social network users identified.

19 Claims, 8 Drawing Sheets

(56) References Cited

U.S. PATENT DOCUMENTS

| | | | |
|---|---|---|---|
| 2009/0157693 A1* | 6/2009 | Palahnuk | G06Q 30/00 |
| 2009/0215486 A1* | 8/2009 | Batni | H04L 51/28 |
| | | | 455/550.1 |
| 2009/0216773 A1* | 8/2009 | Konopnicki | G06F 17/30867 |
| 2009/0255153 A1* | 10/2009 | Mori | G09D 3/12 |
| | | | 40/107 |
| 2010/0251292 A1* | 9/2010 | Srinivasan | H04N 21/41407 |
| | | | 725/37 |
| 2010/0306815 A1* | 12/2010 | Emerson | H04N 21/4788 |
| | | | 725/134 |
| 2011/0070879 A1* | 3/2011 | Walter | H04N 7/163 |
| | | | 455/420 |
| 2011/0122810 A1* | 5/2011 | Hodroj et al. | 370/328 |
| 2011/0145581 A1* | 6/2011 | Malhotra | H04N 21/43615 |
| | | | 713/171 |
| 2011/0153740 A1* | 6/2011 | Smith | H04L 67/20 |
| | | | 709/204 |
| 2012/0011553 A1* | 1/2012 | Maddali | H04N 21/4126 |
| | | | 725/106 |
| 2012/0066602 A1* | 3/2012 | Chai et al. | 715/733 |
| 2012/0174157 A1* | 7/2012 | Stinson et al. | 725/40 |
| 2012/0233120 A1* | 9/2012 | Nijim | H04N 21/4788 |
| | | | 707/626 |
| 2014/0067969 A1* | 3/2014 | Archibong | H04N 21/632 |
| | | | 709/206 |

\* cited by examiner

SOCIAL NETWORK CREATION AND INTERACTION

BACKGROUND

Currently available network technologies include social networking technologies by which an individual may create an online profile and interact with others via instant messages, e-mail messages, sharing pictures, etc. Some of these technologies have become accessible through televisions. However, currently available social networking technologies have not been adopted by television technologies in a satisfactory manner.

DETAILED DESCRIPTION OF PREFERRED EMBODIMENTS

The following detailed description refers to the accompanying drawings. The same labels and/or reference numbers in different drawings may identify the same or similar elements.

Systems and/or devices, described herein, may be used to interconnect a set top box (hereinafter referred to as "STB") and a user device to create a social network and/or to enable a user to interact with the social network via a combination of the STB and the user device. For example, a STB may establish a secure connection with a user device (e.g., a mobile telephone), retrieve address book information (e.g., contacts) from the user device, and identify social network users corresponding to the address book information. The STB may also, or alternatively, communicate a social network invitation to one or more of the network users, and create a social network based on responses to the social network invitations. Additionally, or alternatively, when a social network has already been created, the STB may establish a secure connection with the user device and synchronize a social network application with a social network application on the user device. The STB may also, or alternatively, detect social network activity and implement the social network activity on both the STB and the user device.

As such, systems and/or devices, described herein, may provide an automated solution to creating a social network that is based on, or anchored to, information stored by a mobile telephone or another type of user device. In addition, since the STB and the user device may be synchronized (e.g., displayed on both the STB and the user device), the user may interact with the social network using a combination of the STB and the user device. For instance, the user may view social network activity on a relatively large video display connected to the STB and, at the same time, use the more user-friendly input or interface features of the user device to interact with the social network.

Figure 1:
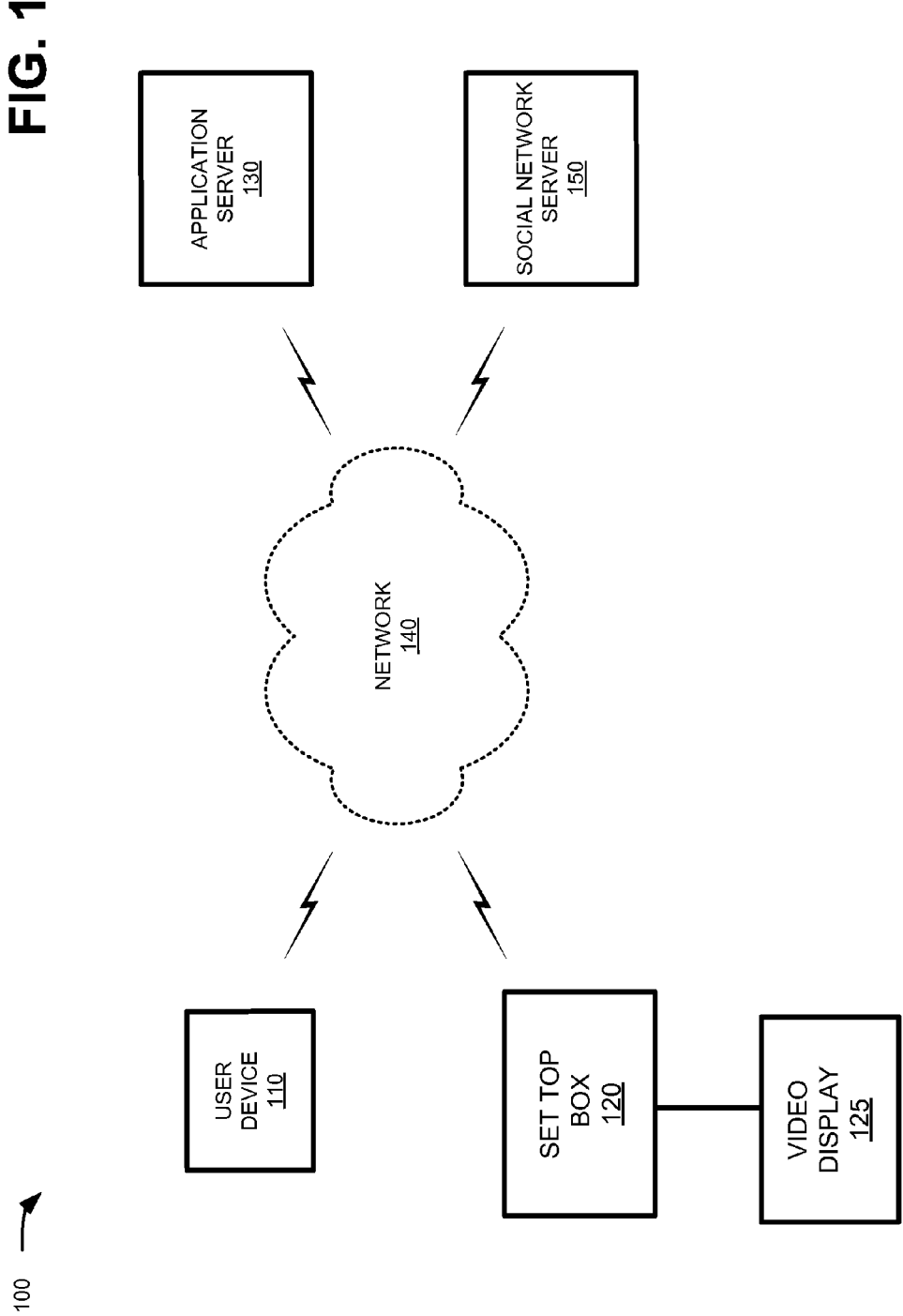
FIG. 1 is a diagram of an example environment in which systems and/or methods, described herein, may be implemented.

FIG. 1 is a diagram of an example environment 100 in which systems and/or methods, described herein, may be implemented. As depicted, environment 100 may include a user device 110, a STB 120, a video display 125, an application server 130, network 140, and social network server 150. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1. For instance, in some implementations, environment 100 may include any type of client equipment, such as a video player, a video game console, etc.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include a type of device, such as a wireless mobile communication device, that is capable of communicating with network 140. For example, user device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of device.

STB 120 may include a device that can communicate with network 140 to receive and/or process video content. In an example implementation, STB 120 may include a set top box, a digital video recorder, a cable card, and/or another type of device that includes a video tuner. STB 120 may download, from application server 130, an application that enables STB 120 to establish a connection with user device 110. In some implementations, user device 110 may download a complementary application, from application server 130, to enable such a connection.

The connection between user device 110 and STB 120 may enable STB 110 to interact with user device 110 in one or more of a variety of ways. For instance, the connection may enable user device 110 to operate as a remote control with respect to set top box (e.g., to change channels, browse a program guide, modify volume levels, alter settings, record programs, download applications from application server 130, execute downloaded applications, etc.). As described herein, the connection may also, or alternatively, enable STB 120 to create a social network and provide one or more social networking functions or services that involve user device 110.

Video display 125 may include one or more devices capable of receiving, processing, and/or displaying video and/or audio signals, associated with video content, received from STB 120. In one example implementation, video display 125 may take the form of a television. In another implementation, video display 125 may include a computer monitor.

Application server 130 may include one or more devices, or other types of computing devices, that gather, process, search, store, and/or provide information in a manner similar to that described herein. In one example implementation, application server 130 may include a web server that stores one or more applications and/or that permits the one or more applications to be accessed and/or downloaded by user device 110 and/or STB 120. Application server 130 may transmit an application, to STB 120 and/or user device 110, in response to a request and/or in exchange for payment from STB 120 and/or user device 110.

Network 140 may include a single network or multiple networks. For example, network 140 may include a video signaling and distribution network, such as a fiber optic-based network (e.g., a fiber optic service network), that distributes information and/or television content to STB 120. Additionally, or alternatively, network 140 may include one or more wired and/or wireless networks. For example, network 140 may include a cellular network, the Public Land Mobile Network (PLMN), and/or a second generation (2G) network, a third generation (3G) network, a fourth generation (4G) network, a fifth generation (5G) network, and/or another network (e.g., a long term evolution (LTE) network). Additionally, or alternatively, network 140 may include a wide area network (WAN), a metropolitan area network (MAN), an ad hoc network, an intranet, the Internet, a virtual network (e.g., a virtual private network (VPN)), a telephone network (e.g., a Public Switched Telephone Network (PSTN)), a Voice over IP (VoIP) network, and/or a combination of these or other types of networks.

Social network server 150 may include one or more devices, or other types of computing devices, that gather, process, search, store, and/or provide information in a manner similar to that described herein. In one example implementation, social network server 150 may include a network server that stores information corresponding to social network users. For instance, social network server 150 may include profile information, such as names, street addresses, telephone numbers, etc., corresponding to users participating in a social network. In one implementation, each of the social network users may also, or alternatively, be subscribers to a particular type or combination of services, such as subscribers to a fiber optic network service, a telecommunications network service, and Internet service, a cable television service, etc.

Figure 2:
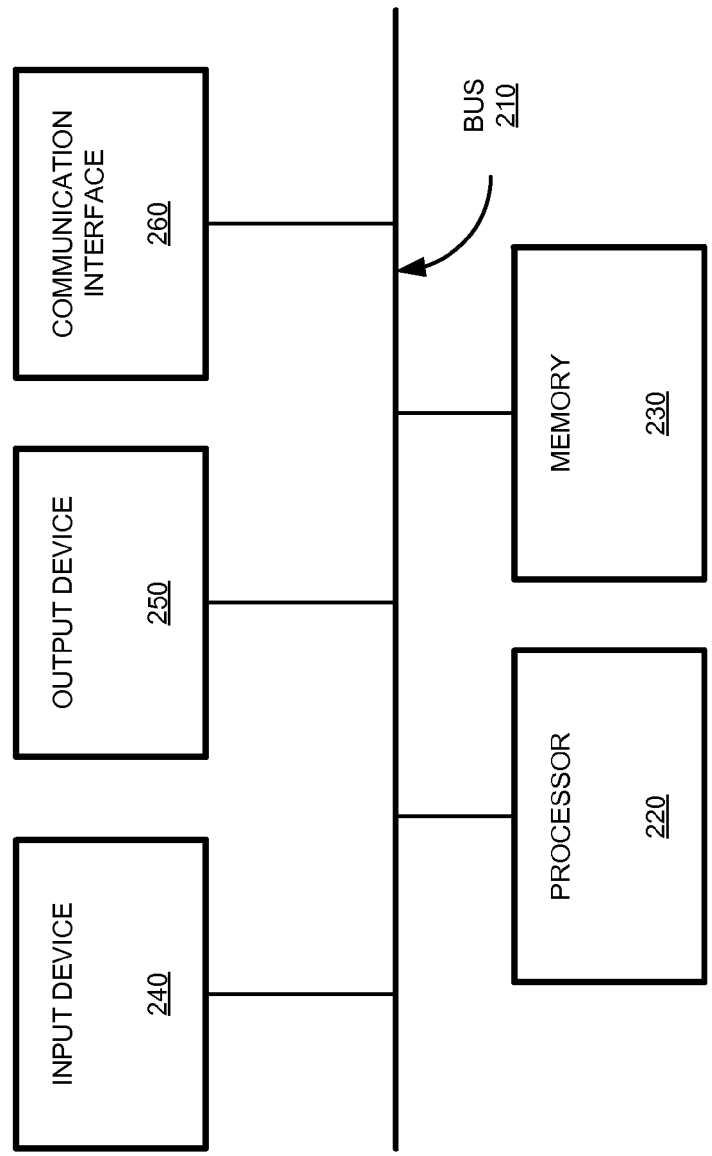
FIG. 2 is a diagram of an example of a device of FIG. 1.

FIG. 2 is a diagram of example components of a device 200 that may be used within environment 100 of FIG. 1. Device 200 may correspond to user device 110, set top box 120, application server 130, and/or social network server 150. Each of user device 110, set top box 120, application server 130, and/or social network server 150 may include one or more of devices 200 and/or one or more of the components of device 200.

As depicted, device 200 may include bus 210, processor 220, memory 230, input device 240, output device 250, and communication interface 260. However, the precise components of device 200 may vary between implementations. For example, depending on the implementation, device 200 may include fewer components, additional components, different components, or differently arranged components than those illustrated in FIG. 2.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated), and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 260 may also include an antenna (or a set of antennas) that permit wireless communication, such as the transmission and reception of radio frequency (RF) signals.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3:
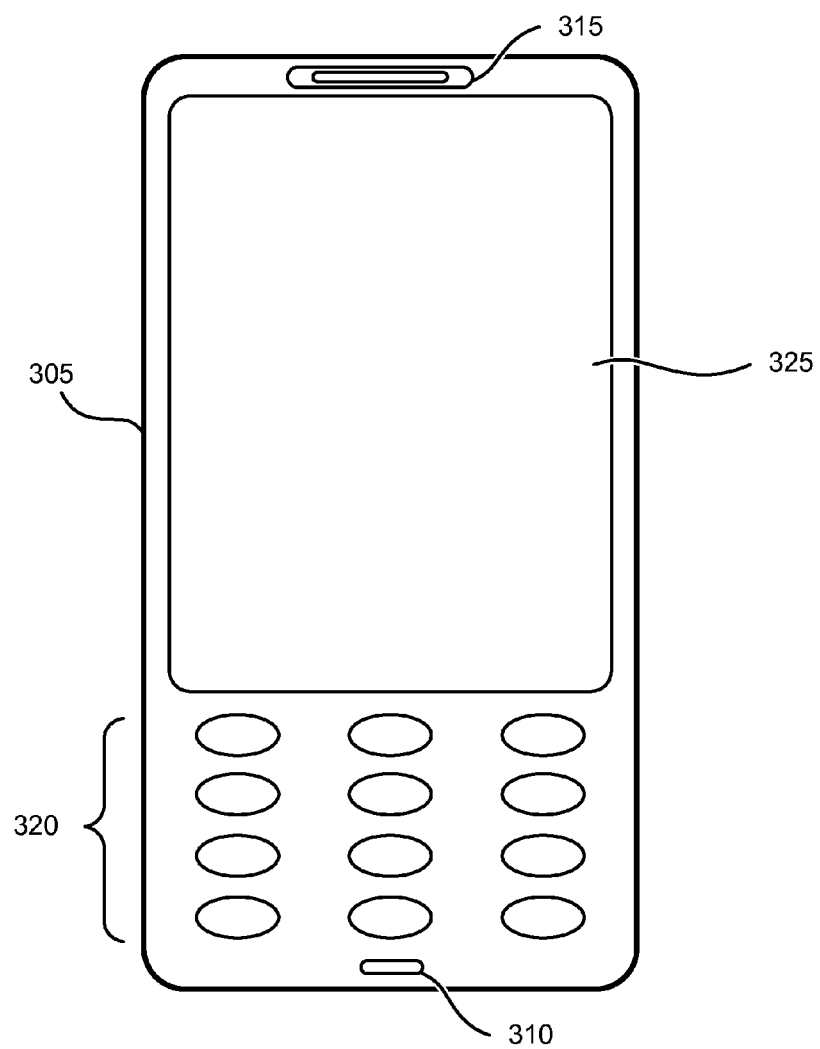
FIG. 3 is a diagram of an example user device of FIG. 1.

FIG. 3 is a diagram of an example user device 110. As illustrated in FIG. 3, user device 110 may include a housing 305, a microphone 310, a speaker 315, a keypad 320, and a display 325.

Housing 305 may include a structure to contain components of user device 110. For example, housing 305 may be formed from plastic, metal, or some other material. Housing 305 may support microphone 310, speakers 315, keypad 320, and display 325.

Microphone 310 may include an input device that converts a sound wave to a corresponding electrical signal. For example, the user may speak into microphone 310 during a telephone call or to execute a voice command. Speaker 315 may include an output device that converts an electrical signal to a corresponding sound wave. For example, the user may listen to music, listen to a calling party, or listen to other auditory signals through speaker 315.

Keypad 320 may include an input device that provides input into user device 110. Keypad 320 may include a standard telephone keypad, a QWERTY keyboard, and/or some other type or arrangement of keys. Keypad 320 may also include one or more special purpose keys. The user may utilize keypad 320 as an input component to user device 110. For example, the user may use keypad 320 to enter information, such as alphanumeric text, to access data, or to invoke a function or an operation.

Display 325 may include an output device that outputs visual content, and/or may include an input device that receives user input (e.g., a touch screen (also known as a touch display)). Display 325 may be implemented according to a variety of display technologies, such as, a liquid crystal display (LCD), a plasma display panel (PDP), a field emission display (FED), a thin film transistor (TFT) display, or some other type of display technology. Additionally, display 325 may be implemented according to a variety of sensing technologies, such as, capacitive sensing, surface acoustic wave sensing, resistive sensing, optical sensing, pressure sensing, infrared sensing, gesture sensing, etc. Display 325 may display text, images, and/or video to the user. Display 325 may also display a user interface (e.g., a graphical user interface (GUI)) of user device 110 or a user interface of some other device which user device 110 controls, a user interface associated with applications, or the like.

Although FIG. 3 shows example components of user device 110, in other implementations, user device 110 may contain fewer components, different components, differently arranged components, or additional components than depicted in FIG. 3. For example, in some implementations, user device 110 may include a camera or another type of optical sensor. Alternatively, or additionally, one or more components of user device 110 may perform one or more other tasks described as being performed by one or more other components of user device 110.

Figure 4:
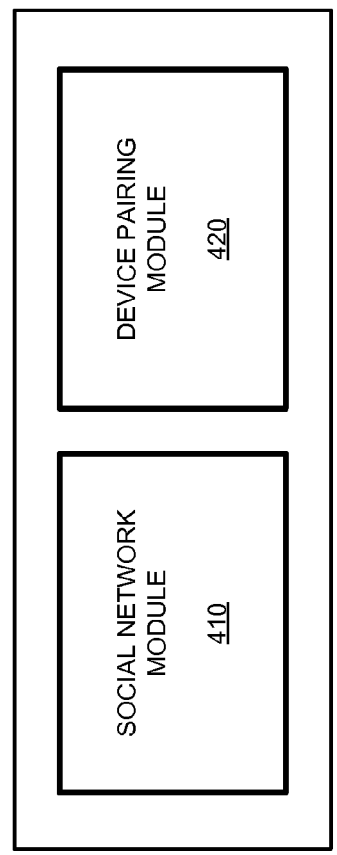
FIG. 4 a diagram of example functional components of a set top box according to one or more implementations described herein.

FIG. 4 is a diagram of example functional components of STB 120 according to one or more implementations described herein. As illustrated, STB 120 may include social network module 410 and device pairing module 420. Depending on the implementation, one or more of modules 410-420 may be implemented as a combination of hardware and software based on the components illustrated and described with respect to FIG. 2. Alternatively, modules 410-420 may each be implemented as hardware based on the components illustrated and described with respect to FIG. 2. In addition, while some of the operations, processes, and capabilities, described herein, are attributed to STB 120, other devices may also, or alternatively be used to perform such operations, processes, and capabilities. Examples of such devices may include video disc players, video game consoles, televisions, etc.

Social network module 410 may provide functionality with respect to social networks. For example, social network module 410 may enable STB 210 to obtain address book information (e.g., contacts) from user device 110. Social network module 410 may also, or alternatively, enable STB 210 to identify social network users corresponding to the address book information, send social network invitations the identified social network users, and create a social network based on responses to the social network invitations (e.g., from the identified social network users).

Device pairing module 420 may provide functionality with respect to user device 110. For example, device pairing module 420 may enable STB 120 to establish a secure connection with user device 110 (e.g., after the social network has been created), synchronize with user device 110, detect social network activity corresponding to user device 110, and implement the social network activity. Device pairing module 420 may also, or alternatively, enable STB 120 to update social network information stored by STB 120 with social network information stored by user device 110.

In addition to the functionality described above, functional components of STB 120 may also, or alternatively, provide functionality as described elsewhere in this specification. Additionally, or alternatively, as described below, one or more of the functions or operations of STB 120 may be performed by another device. Further, while FIG. 4 shows a particular number and arrangement of modules, in alternative implementations, STB 120 may include additional modules, fewer modules, different modules, or differently arranged modules than those depicted.

Figure 5:
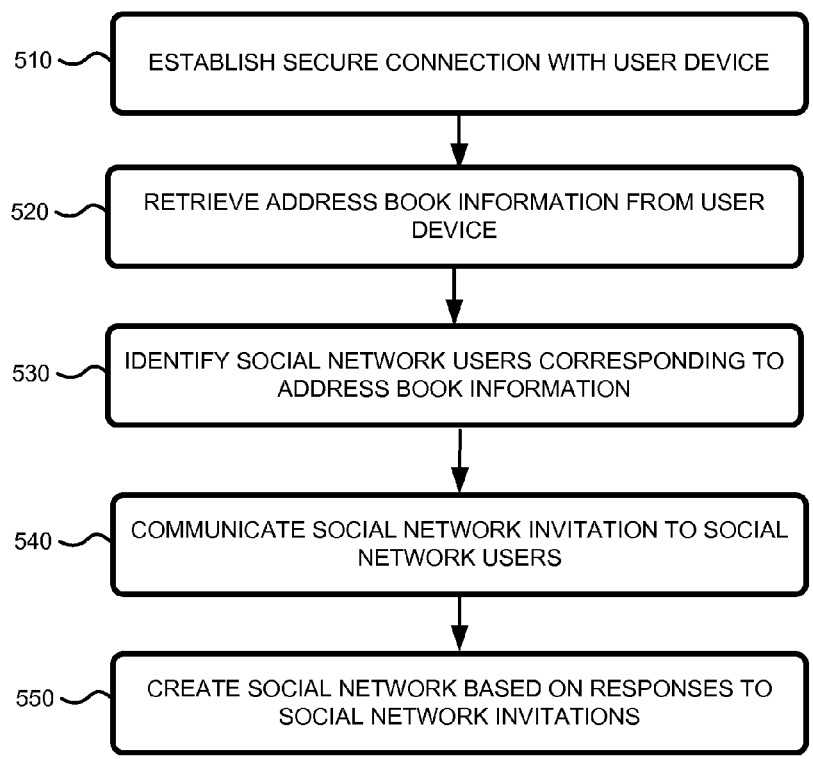
FIG. 5 is a diagram of an example process for creating a social network according to one or more implementations described herein.

FIG. 5 is a diagram of an example process 500 for creating a social network according to one or more implementations described herein. In one or more implementations, process 500 may be performed by one or more components of STB 120 In other implementations, some or all of process 500 may be performed by one or more other components/devices, or a group of components/devices, including or excluding STB 120. For instance, in some implementations, some or all of process 500 may be performed by application server 130 and/or social network server 150.

As shown in FIG. 5, process 500 may include establishing a secure connection with a user device (block 510). For example, STB 120 may establish a secure connection with user device 110. In one example, a user may use a STB input device (such as a STB remote control) to provide STB 120 with an identifier (such as a telephone number) of user device 110, and STB 120 may use the identifier to contact user device 110 and/or establish an encrypted connection with user device 110. In one example, after STB 120 and user device 110 are connected, user device 110 may operate as a remote control for the STB 120, in addition to being able to send and receive various forms of data from STB 120, including multimedia information, social network information, etc.

Process 500 may also include retrieving address book information from the user device (block 520). For instance, STB 120 may identify or locate an address book within user device 110, and retrieve address book information from the address book. The address book information may include any variety of information corresponding to a contact, a profile, or another type of information relating to the address book. For instance, address book information may include information corresponding to a particular individual, such as a first name, a middle name, a last name, a street address, a home telephone number, a mobile telephone number, a work telephone number, an e-mail address, a website uniform resource locator (URL), etc. In some implementations, the address book information may include information corresponding to another type of entity, such as a business, an association, a non-profit organization, or another type of organization. As such, STB 120 may retrieve a wide variety of information stored by user device 110.

As illustrated, process 500 may also include identifying social network users corresponding to the address book information (block 530). For instance, STB 120 may communicate with social network server 150 to access or otherwise obtain information corresponding to users of a social network, and compare the information with the address book information obtained from user device 110. In one implementation, such operations, or similar types of operations, may enable STB 120 to identify individuals (or other entities) that are common amongst the address book information and the social network. In other words, STB 120 may identify which social network users are familiar to the user of user device 110. As mentioned above, the user of user device 110 and the social network users may each correspond to a particular type or combination of network services, such as fiber optic network services, telecommunication services, cable television services, etc.

Process 500 may also include communicating social network invitations to social network users (block 540). For example, STB 120 may communicate social network invitations to users (or user profiles) that are included in the address book. The social network invitation may include a variety of information corresponding to the user of user device 110, a particular social network user (e.g., the recipient of the social network invitation), the social network, a description of the social network invitation, or another type of information relevant to inviting a social network user to join a social network corresponding to the user of user device 110.

As depicted in FIG. 5, process 500 may include creating a social network based on responses to the social network invitations (block 550). For example, STB 110 may receive responses to social network invitations that were communicated to social network users on behalf of the user of user device 110. In some implementations, a social network invitation may include a button, a hyperlink, a prompt, or another type of interface object that enables a recipient of the social network invitation to accept, ignore, decline, or otherwise respond to the social network invitation. As such, STB 110 may receive a message, an indication, or some other type of information notifying STB 110 of the response, and STB 110 may create a social network based on such responses. For instance, in response to being notified of a social network invitation being accepted, STB 110 may associate an account or a profile corresponding to the user of user device 110 with an account or a profile corresponding to the individual (or other type of entity) that accepted the social network invitation. As such, STB 110 may provide an automated solution to building a social network, which may be based on or anchored to user device 110.

While FIG. 5 shows a flowchart diagram of an example process 500 for creating a social network, in other implementations, a process for creating a social network may include fewer operations, different operations, differently arranged operations, or additional operations than depicted in FIG. 5. For example, as discussed below, STB 110 may also, or alternatively, create a social network based on information received from sources other than the address book of user device 110. Additionally, or alternatively, two or more of the operations, described above, may be implemented in parallel.

Figure 6:
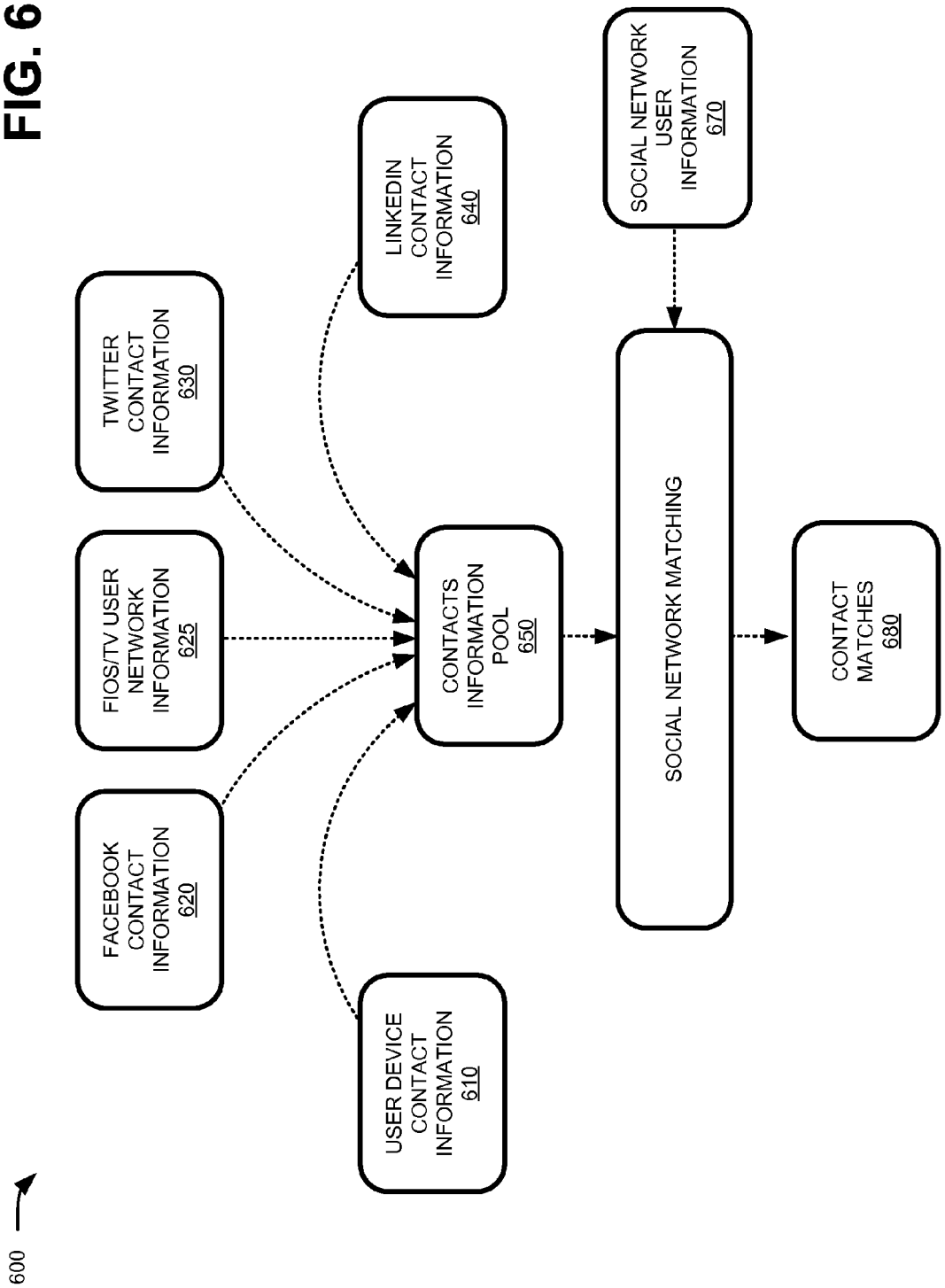
FIG. 6 is a diagram of an example of the process described in FIG. 5.

FIG. 6 is a diagram of an example 600 of the process described in FIG. 5. As depicted in FIG. 6, in addition to receiving address book information (e.g., user device contact information 610) from user device 110, STB 120 may receive facebook contact information 620 (e.g., information from www.Facebook.com), twitter contact information 630 (e.g., information from www.Twitter.com), linkedin contact information 640 (e.g., information from www.LinkedIn.com), and/or another type of contact information source. In some implementations, STB 110 may prompt or otherwise enable a user of user device 110 to input account information (e.g., a user name, password, etc.) corresponding to a particular source of contact information, and STB 110 may use the account information to retrieve contact information from the corresponding source.

In some implementations, STB 120 may be capable of identifying the types of contact information (e.g., a first name, a last name, a telephone number, a street address, an e-mail address, etc.) received, and may format the contact information in a manner that is consistent with performing one or more of the additional, or alternative, operations or processes discussed herein. For instance, STB 110 may format user device contact information (e.g., address book information), facebook contact information 620, twitter contact information 630, and linkedin contact information 640 to a particular format, in order to create a contact information pool 650 that includes uniformly formatted information. STB 120 may also, or alternatively, perform one or more social network matching operations to identify the information corresponding to contacts information pool 650 with users (or other entities) corresponding to social network user information 670. Based on such operations, STB 120 may identify matches (e.g., contact matches 680) between contacts information pool 650 and social network user information 670, which may, for example, lead to STB 120 communicating social network invitations, as described above with reference to FIG. 5.

As such, STB 120 may retrieve social network information from a variety of social network sources (e.g., user device contacts information 610 (e.g., address book information), facebook contacts information 620, FIOS/TV user network information 625 (e.g., information about individuals receiving television services via a particular services, such as Verizon's FIOS service), twitter contacts information 630, linkedin contacts information 640, etc.) and use the information to create a social network. As mentioned above, each of the social network users corresponding to social network user information 670 may correspond to subscribers of one or more of a variety of network services (e.g., a fiber optic network service, a telecommunications network service, an Internet service, etc.).

Figure 7:
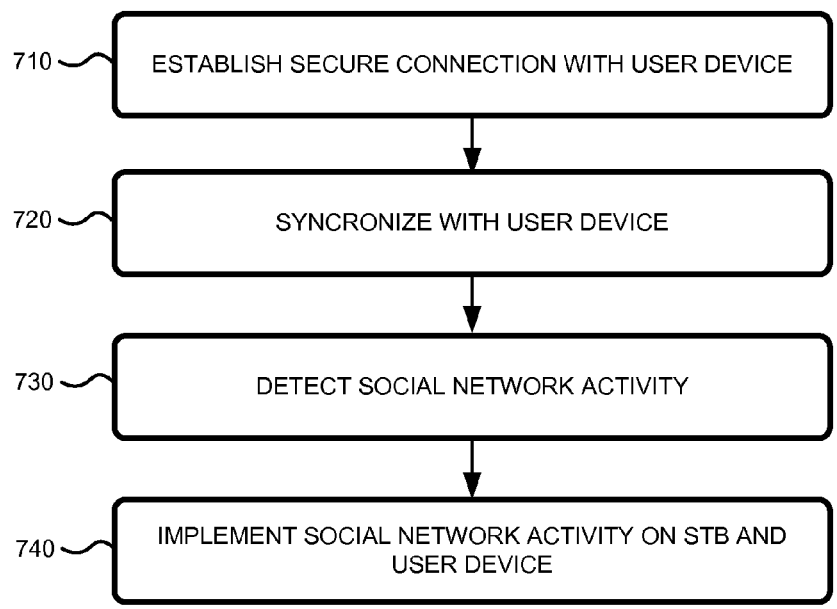
FIG. 7 is a diagram of example process for interacting with a social network according to one or more implementations described herein.

FIG. 7 is a diagram of an example process 700 for interacting with a social network according to one or more implementations described herein. In some implementations, process 700 may be performed by one or more components of STB 120. In other implementations, some or all of process 700 may be performed by one or more other components/devices, or a group of components/devices, including or excluding STB 120. For instance, in some implementations, some or all of process 700 may be performed by application server 130 and/or social network server 150.

As depicted in FIG. 7, process 700 may include establishing a secure connection with a user device (block 710). For example, STB 110 may establish a secure connection with user device 110. The secure connection may be initiated by STB 120. The secure connection may also, or alternatively, be initiated by user device 110. The secure connection may be implemented using one or more of a variety of network technologies, such as the network technologies described above with reference to network 140. For instance, the secure connection may be established using a WWAN connection corresponding to user device 110 and a fiber optic network connection corresponding to STB 120. Additionally, or alternatively, the secure connection may be established using a LAN connection, a Bluetooth connection, a wireless 802.11, etc., directly between user device 110 and STB 120, or between user device 110 and STB 120 via a local network device, such as a router.

Process 700 may also include synchronizing with the user device (block 720). For instance, STB 120 may synchronize one or more social network operations or processes with user device 110. In one example, synchronizing user device 110 and STB 120 may include updating the social network based on updates or other types of changes to the address book information stored by user device 110. Additionally, or alternatively, STB 120 may synchronize with user device 110 by identifying a state of operation corresponding to a social network application being executed by user device 110 and mirroring, mimicking, displaying, or otherwise implementing the same or similar state of operation corresponding to a social network application being executed by STB 120. For instance, if a user profile interface, corresponding to the social network, is currently being displayed by user device 110, STB 120 may also display the user profile interface. In this manner, the user may have the option to view the user profile interface via display 325 of user device 110 and/or video display 125 corresponding to STB 120.

As depicted, process 700 may also include detecting social network activity (block 730). For example, STB 120 may detect social network activity based on information received from user device 110. For instance, a user of user device 110 may engage in social network activity via user device 110, and the social network activity may be detected by STB 110. The social network activity may correspond to any type of input, action, reaction, or state change corresponding to the social network and/or a social network application. For instance, social network activity may include an input originating from the user via user device 110 or STB 120. Additionally, or alternatively, social network activity may include an input from a social network contact or another individual other than the user of user device 110.

Process 700 may include implementing the social network activity on the STB and the user device (block 740). For example, in response to detecting social network activity corresponding to user device 110, STB 120 may cause the same social network activity to be executed, displayed, or otherwise implemented by STB 120. Similarly, in response to detecting social network activity corresponding to STB 120, STB 120 may cause the same social network activity to be executed, displayed, or otherwise implemented by user device 110. As suggested above, mirroring social network activity between user device 110 and STB 120 may provide the user of user device 110 with an option of, for example, interacting with the social network by viewing a social network interface displayed on a relatively large display device (e.g., video display 125), but using user device 110 to engage in the social network activity.

While FIG. 7 shows a flowchart diagram of an example process 700 for interacting with a social network, in other implementations, a process for interacting with a social network may include fewer operations, different operations, differently arranged operations, or additional operations than depicted in FIG. 7. Additionally, or alternatively, two or more of the operations, described above, may be implemented in parallel.

Figure 8:
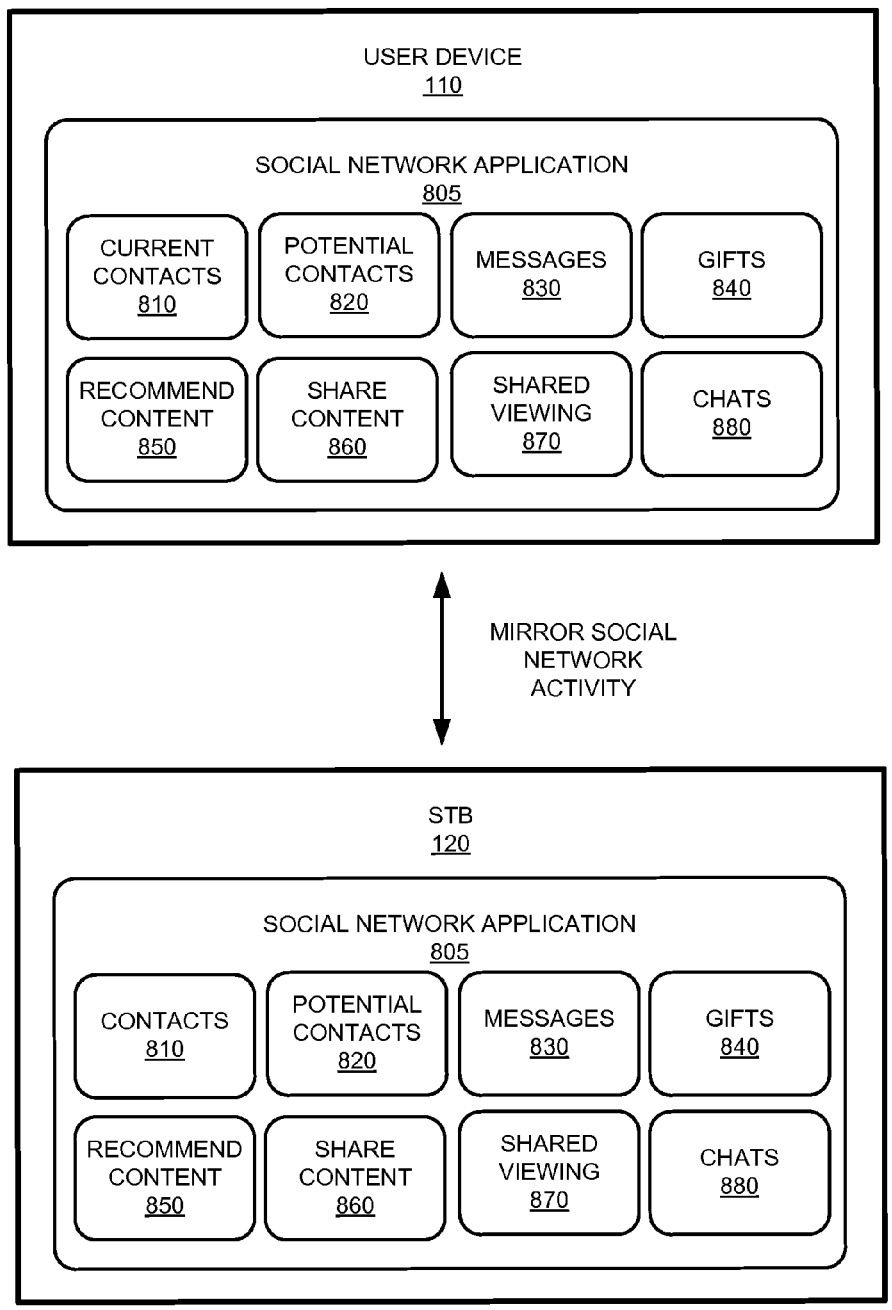
FIG. 8 is a diagram of an example of the process described in FIG. 7.

FIG. 8 is a diagram of an example 800 of the process described in FIG. 7. As depicted in FIG. 8, user device 110 and STB 120 may each include social network applications 805 that may be mirrored or otherwise synchronized. As depicted in FIG. 8, social network application 805 may provide a list of current contacts 810 that the user of user device 110 may contact or otherwise interact with. In some implementations, the list of current contacts may also, or alternatively, indicate which contacts are currently logged in, online, or otherwise available. Social network application 805 may also, or alternatively, include a list of potential contacts, which may include individuals that the user of user device 110 may know or may be interested in adding to the social network. In addition, social network application 805 may include functionality for sending and/or receiving messages 830 from contacts or other social network users.

Additionally, or alternatively, social network application 805 may enable a user to give gifts, such as media-related content (e.g., movies, television programs, music, images, etc.), enhanced social network services (e.g., multimedia messaging capabilities, access to privileged content, enhanced content sharing capabilities, etc.), etc. As depicted in FIG. 8, social network application 805 may also, or alternatively, enable a user to receive or send content recommendations (e.g., recommend content 850), share content with other social network users (e.g., share content 860), simultaneously view content with other social network users (e.g., shared viewing content 870), and/or engage in instant messaging chats with other social network users (e.g., chats 880).

While FIG. 8 shows a particular arrangement of devices, applications, and functionalities, in other implementations, example 800 may fewer devices, applications, and functionalities, different devices, applications, and functionalities, differently arranged devices, applications, and functionalities, or additional devices, applications, and functionalities than depicted in FIG. 8.

Accordingly, systems and devices, as described herein, may provide solutions for creating a social network and interacting with a social network. For example, STB 120 may establish a secure connection with user device 110, retrieve address book information from user device 110, and identify social network users corresponding to the address book information. In some implementations, the social network users may each correspond to a particular network service or combination of network services. STB 120 may also, or alternatively, communicate a social network invitation to one or more of the social network users, and create a social network based on responses to the social network invitations. Additionally, or alternatively, when a social network has already been created, STB 120 may establish a secure connection with user device 110, synchronize a social network application with user device 110, detect social network activity, and implement the social network activity on STB 120 and user device 110. Accordingly, systems and devices, described herein, may provide an automated solution to creating a social network based on contacts or other types of information, and/or synchronize social network activity between STB 120 and user device 110.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a set top box, an identifier of a user device;
   establishing, by the set top box, a connection with the user device using the received identifier;
   retrieving, by the set top box, address book information from the user device via the connection,
      where the address book information comprises contact information corresponding to one or more individuals;
   retrieving, by the set top box, social network information corresponding to a plurality of subscribers of social network services;
   comparing, by the set top box, the retrieved social network information to the retrieved address book information;
   identifying, by the set top box and based on the comparing, one or more social network subscribers corresponding to the address book information,
      where each social network subscriber, of the one or more social network subscribers, comprises a subscriber to a particular network service, and
   wherein each social network subscriber, of the one or more social network subscribers, is an individual of the one or more individuals corresponding to contact information included in the address book information;
   creating a social network based on identifying the one or more social network subscribers, wherein each member of the social network is a social network subscriber of the one or more identified social network subscribers;
   synchronizing a social network application corresponding to the set top box with a social network application corresponding to the user device;
   detecting social network activity corresponding to the social network application corresponding to the user device; and
   displaying, based on the detecting, the social network activity via the social network application corresponding to the set top box.

2. The method of claim 1, further comprising:
   communicating a social network invitation to each social network subscriber of the one or more social network subscribers,
   where creating the social network is based on responses from the one or more social network subscribers.

3. The method of claim 1, where the address book information comprises at least one of:
   a name corresponding to a particular subscriber of the particular network service,
   a telephone number corresponding to a particular subscriber of the particular network service,
   a street address corresponding to a particular subscriber of the particular network service, or
   an e-mail address corresponding to a particular subscriber of the particular network service.

4. The method of claim 1, where the particular network service comprises at least one of:
   a fiber optic network service,
   a cable television network service,
   a telecommunications service, or
   an Internet service.

5. The method of claim 1, where creating the social network comprises creating an association between a user profile corresponding to a user of the user device and a user profile corresponding to a social network subscriber of the one or more social network subscribers.

6. The method of claim 1, where:
   the set top box is connected to a video display device,
   the user device comprises a mobile device, and
   establishing the connection with the user device comprises establishing a secure connection between the set top box and the mobile device.

7. The method of claim 1, where synchronizing the social network application and implementing the social network activity comprises mirroring a graphical user interface corresponding to a video display connected to the set top box and a graphical user interface corresponding to a display of the user device.

8. The method of claim 1, further comprising:
   after the social network has been created,
      establishing another connection with the user device;
      identifying updated address book information corresponding to the user device, where the updated address book information comprises changes to the address book information;
      identifying additional social network subscribers corresponding to the updated address book information,
         where each additional social network subscriber, of the additional social network subscribers, comprises a subscriber to the particular network service,
      communicating social network invitations to each additional social network subscriber; and
      updating the social network based on responses corresponding to each social network invitation.

9. A set top box, comprising:
   a memory to store one or more instructions; and
   a processor to execute the one or more instructions, to:
      receive an identifier of a user device;
      establish a connection with the user device using the received identifier;
      retrieve address book information from the user device via the connection, wherein the address book information comprises contact information corresponding to one or more individuals;
      retrieve social network information corresponding to a plurality of subscribers to social network services;
      compare the retrieved social network information to the retrieved address book information;
      identify, based on the comparing, one or more social network subscribers corresponding to the address book information, wherein each social network subscriber, of the one or more social network subscribers, comprises a subscriber to a particular network service, and wherein each social network subscriber, of the one or more social network subscribers, is an individual of the one or more individuals corresponding to contact information included in the address book information;
create a social network based on the one or more identified social network subscribers, wherein each member of the social network is a social network subscriber of the one or more identified social network subscribers;
synchronize a social network application, associated with the social network, corresponding to the set top box with a social network application corresponding to the user device;
detect social network activity corresponding to the social network application corresponding to the user device; and
display the social network activity with the social network application corresponding to the user device,
where, to synchronize the social network application and implement the social network activity, the processor is to:
update a graphical user interface corresponding to a video display connected to the set top box to be consistent with a graphical user interface corresponding to a display of the user device.

10. The set top box of claim 9, where the processor is further to:
communicate a social network invitation to each social network subscriber of the one or more social network subscribers,
where the social network is based on responses to the social network invitation from the one or more social network subscribers.

11. The set top box of claim 9, where the address book information comprises at least one of:
a name corresponding to a particular subscriber of the particular network service,
a telephone number corresponding to a particular subscriber of the particular network service,
a street address corresponding to a particular subscriber of the particular network service, or
an e-mail address corresponding to a particular subscriber of the particular network service.

12. The set top box of claim 9, where the particular network service comprises at least one of:
a fiber optic network service,
a cable television network service,
a telecommunications service, or
an Internet service.

13. The set top box of claim 9, further comprising:
after the social network has been created,
establishing another connection with the user device;
identifying updated address book information corresponding to the user device, where the updated address book information comprises changes to the address book information;
identifying an additional social network subscriber corresponding to the updated address book information,
where the additional social network subscriber comprises a subscriber to the particular network service;
communicating a social network invitation to the additional social network subscriber; and
updating the social network based on a response corresponding to the social network invitation.

14. The set top box of claim 9, wherein, when creating the social network, the processor is further to:
create an association between a user profile corresponding to a user of the user device and a user profile corresponding to a social network subscriber of the one or more social network subscribers.

15. One or more non-transitory computer-readable storage media, comprising:
one or more instructions that, when executed by a processor of a set top box, cause the processor to:
receive an identifier of a user device,
establish a connection with the user device using the received identifier,
retrieve address book information from the user device via the connection,
where the address book information comprises contact information corresponding to one or more individuals,
retrieve social network information corresponding to a plurality of subscribers of social network services;
compare the retrieved social network information to the retrieved address book information;
identify one or more social network subscribers corresponding to the address book information,
where each social network subscriber, of the one or more social network subscribers, comprises a subscriber to a particular network service, and
wherein each social network subscriber, of the one or more social network subscribers, is an individual of the one or more individuals corresponding to contact information included in the address book information,
communicate a social network invitation to each social network subscriber of the one or more social network subscribers,
create a social network based on responses to the social network invitation from the one or more social network subscribers, wherein each member of the social network is a social network subscriber of the one or more social network subscribers,
where the social network comprises associations between a user profile corresponding to a user of the user device and a user profile corresponding to a social network subscriber,
synchronize a social network application corresponding to the set top box with a social network application corresponding to the user device,
detect social network activity corresponding to the social network application corresponding to the user device, and
display the social network activity via the social network application corresponding to the set top box.

16. The computer-readable storage media of claim 15, where the address book information comprises at least one of:
a name corresponding to a particular subscriber of the particular network service,
a telephone number corresponding to a particular subscriber of the particular network service,
a street address corresponding to a particular subscriber of the particular network service, or
an e-mail address corresponding to a particular subscriber of the particular network service.

17. The computer-readable storage media of claim 15, where the particular network service comprises at least one of:
a fiber optic network service, a cable television network service,
a telecommunications service, or
an Internet service.

18. The computer-readable storage media of claim 15, where, to synchronize the social network application and implement the social network activity, the processor is to:
update a graphical user interface corresponding to a video display connected to the set top box to be consistent with a graphical user interface corresponding to a display of the user device.

19. The computer-readable storage media of claim 15, where the one or more instructions cause the processor further to:
establish another connection with the user device,
identify updated address book information corresponding to the user device, where the updated address book information comprises a change to the address book information,
identify an additional social network subscriber corresponding to the updated address book information, where the additional social network subscriber comprises a subscriber to the particular network service,
communicate a social network invitation to the additional social network subscriber, and
update the social network based on a response corresponding to the social network invitation.

* * * * *